US007243055B2

(12) United States Patent
Chen et al.

(10) Patent No.: US 7,243,055 B2
(45) Date of Patent: Jul. 10, 2007

(54) COMPOSITE STACKING SEQUENCE OPTIMIZATION FOR MULTI-ZONED COMPOSITES

(75) Inventors: Bing-Chung Chen, Thousand Oaks, CA (US); Christopher C. Eastland, Kenmore, WA (US); Christopher T. Hanson, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 547 days.

(21) Appl. No.: 10/766,177

(22) Filed: Jan. 28, 2004

(65) Prior Publication Data

US 2005/0163975 A1 Jul. 28, 2005

(51) Int. Cl.
  *G06F 17/10* (2006.01)
  *G06F 17/50* (2006.01)
(52) U.S. Cl. .................. 703/2; 703/1; 703/6; 345/420; 700/182
(58) Field of Classification Search .............. 703/1, 703/2, 6, 7; 345/420, 423; 700/97, 98, 182; 156/212
  See application file for complete search history.

(56) References Cited

U.S. PATENT DOCUMENTS

| 4,534,813 A | 8/1985 | Williamson et al. |
| 4,646,251 A | 2/1987 | Hayes et al. |
| 4,849,913 A | 7/1989 | Ward et al. |
| 4,937,768 A | 6/1990 | Carver et al. |
| 4,945,488 A | 7/1990 | Carver et al. |
| 5,006,990 A | 4/1991 | Ward et al. |
| 5,023,800 A | 6/1991 | Carver et al. |
| 5,033,014 A | 7/1991 | Carver et al. |
| 5,038,291 A | 8/1991 | Wang et al. |
| 5,119,309 A | 6/1992 | Cavendish et al. |

(Continued)

FOREIGN PATENT DOCUMENTS

JP   08-229183   9/1996

OTHER PUBLICATIONS

Lhermitte et al., T.D. Anistrophy of the Elastic Properties of Cross-Ply Fiber-Reinforced Composite Materials, IEEE, Ultasonics Symposium, Dec. 1991, pp. 825-830.*

(Continued)

*Primary Examiner*—Russell Frejd
(74) *Attorney, Agent, or Firm*—Alston & Bird LLP

(57) ABSTRACT

Method, apparatus, and computer program products are provided for optimizing a stacking sequence for a composite laminate having multiple zones to reduce the number or length of internal ply edges in the composite laminate with the most design rule compliant sequences. Once the number and location of the zones and the number of plies having different properties required for each zone have been determined for the composite laminate, a master zone is generated. Advantageously, the property of the plies may be fiber orientation, though alternative properties such as material may be considered when determining the number of required plies. The master zone notionally includes the maximum number of plies having a respective property required by any one zone, and the plies of the master zone are sequenced using a predefined series of design rules. The plies of each zone are then arranged based upon the stacking sequence of the master zone. A transformation matrix, a second predefined series of design rules, and a weighted solid/void differential may be used when arranging the plies of each zone based upon the stacking sequence of the master zone.

31 Claims, 10 Drawing Sheets

U.S. PATENT DOCUMENTS

| | | | |
|---|---|---|---|
| 5,197,013 | A | 3/1993 | Dundorf |
| 5,419,231 | A | 5/1995 | Earle, III et al. |
| 5,636,338 | A | 6/1997 | Moreton |
| 5,729,463 | A | 3/1998 | Koenig et al. |
| 5,936,861 | A | 8/1999 | Jang et al. |
| 5,984,511 | A | 11/1999 | Vasey-Glandon et al. |
| 6,341,261 | B1 | 1/2002 | Vasey-Glandon et al. |
| 6,490,496 | B1 | 12/2002 | Dacey |

OTHER PUBLICATIONS

Isasi et al., P. Hoerarchical Genetic Algorithms for Composite Laminate Panels Stress Optimisation, 1999 IEEE International Conference on Systems, Man, and Cybernetics, vol. 4, Oct. 1999, pp. 447-451.*

Chris Waldhart, "Analysis of Tow-Placed, Variable-Stiffness Laminates," Mater's Thesis, Virginia Polytechnic Institute, Jun. 5, 1996, pp. 1-35.

Brian Tatting and Zafer Gurdal, "Design and Manufacture of Tow-placed Variable Stiffness Composite Laminates with Manufacturing Considerations," 13th US National Congress of Applied Mechanics, Jun. 25, 1998.

Patrick Morelle and R. Radovcic, "CAD Based Optimization of Composite Structures," Proceedings of Sixth Int. Conference on OPT, Mar. 16-18, 1999, pp. 311-320.

Jani J. Shah, Mary T. Rogers, Palat C. Sreevalsan, David W. Hsiao, Abraham Mathew, Anant Bhatnagar, Bongee B. Liou and David W. Miller, "The A.S.U. Features Testbed: An Overview," Arizona St. Univ. pp. 233-241.

A.L. Velocci, "R&D Unit Pressed to Save $1 Billion," Aviation Week and Space Technology, May 11, 1998, pp. 75-76.

E.H. Phillips, "Premier 1 Readied for First Flight," Aviation Week and Space Technology, Aug. 31, 1998, p. 39.

R. Flory and E. Bernardon, "Effect of Steering and Conformance Requirements on Automated Material Deposition Equipment," Charles Stark Draper Laboratory, Inc. technical capability document, pp. 1-11, no date available.

V.P. McConnell, "Fiber-placed C-17 Landing Gear Pod Fairings Reduce Price and Parts—Carbon Fiber/Epoxy Unidirectional Towpreg," High Performance Composites, Jul./Aug. 1998, pp. 48-50.

B. Davidson, et al., "An Expert System for the Design and Analysis of Composite Structures", Am. Helicopter Society Conf. And Specialists Mtg. Sep. 21-23, 1993.

C.M.L. Wu et al., "A knowledge based expert system for laminated composite strut design", Aeronautical Journal, Jan. 1991, pp. 1-20.

C.M.L. Wu, "Bolted joints in a laminated composite strut design expert system", Composite Structures 22, 1992, pp. 63-85.

D. Sriram et al., "Knowledge-Based Expert Systems in Structural Design", Computers & Structures, vol. 20, No. 1-3, pp. 1-9, 1985.

J. J. Shah et al. "Analysis of design abstraction, representation and inferencing requirements for computer-aided design", 1989, pp. 1-10.

J.P.H. Webber et al., "An Expert System for Laminated Plate Design Using Composite Materials", Computers & Structures, vol. 37, No. 6, p. 1051-1-67, 1990.

D.P. Costin et al., "Optimum Design of a Composite Structure with Manufacturing Constraints", Thin-Walled Structures 17, pp. 185-202, 1993.

H. Yoshiura, et al., "Top-Down Construction of 3-D Mechanical Object Shapes from Engineering Drawings", IEEE, Dec. 1984, pp. 32-40.

T.C. Woo, "Interfacing Solid Modeling to CAD and CAM: Data Structures and Algorithms for Decomposing a Solid", IEEE, Dec. 1984, pp. 44-49.

A.A.G. Requicha et al., "Representation of Geometric Features, Tolerances, and Attributes in Solid Modelers Based on Constructive Geometry", IEEE Journal of Robotics and Automation, vol. RA-2 No. 3, Sep. '86.

Y.H. Pao et al., "Memory Driven Feature-Based Design", Interim Report Feb. 1988-Dec. 1992.

* cited by examiner

| Zone | 0 | 45 | -45 | 90 |
|---|---|---|---|---|
| Z1 | 12 | 8 | 8 | 4 |
| Z2 | 12 | 8 | 8 | 8 |
| Z3 | 14 | 10 | 10 | 4 |
| Z4 | 14 | 12 | 12 | 6 |
| Z5 | 18 | 14 | 14 | 6 |
| Z6 | 18 | 14 | 14 | 6 |

FIG. 3

| Seq | MZ |
|---|---|
| 1 | 45 |
| 2 | 90 |
| 3 | -45 |
| 4 | 0 |
| 5 | 45 |
| 6 | 0 |
| 7 | -45 |
| 8 | 0 |
| 9 | 45 |
| 10 | 90 |
| 11 | -45 |
| 12 | 90 |
| 13 | 45 |
| 14 | 90 |
| 15 | 0 |
| 16 | -45 |
| 17 | 0 |
| 18 | 45 |
| 19 | 0 |
| 20 | -45 |
| 21 | 0 |
| 22 | 45 |
| 23 | 0 |
| 24 | -45 |
| 25 | 45 |
| 26 | -45 |
| 27 | 0 |
| 28 | 0 |
| 29 | -45 |
| 30 | 45 |
| 31 | -45 |
| 32 | 0 |
| 33 | 45 |
| 34 | 0 |
| 35 | -45 |
| 36 | 0 |
| 37 | 45 |
| 38 | 0 |
| 39 | -45 |
| 40 | 0 |
| 41 | 90 |
| 42 | 45 |
| 43 | 90 |
| 44 | -45 |
| 45 | 90 |
| 46 | 45 |
| 47 | 0 |
| 48 | -45 |
| 49 | 0 |
| 50 | 45 |
| 51 | 0 |
| 52 | -45 |
| 53 | 90 |
| 54 | 45 |

FIG. 4

| Seq | Z1 | Z2 | Z3 | Z4 | Z5 | Z6 |
|---|---|---|---|---|---|---|
| 1 | 45 | 45 | 45 | 45 | 45 | 45 |
| 2 | 90 | 90 | 90 | 90 | 90 | 90 |
| 3 | -45 | -45 | -45 | -45 | -45 | -45 |
| 4 | 0 | 0 | 0 | 0 | 0 | 0 |
| 5 | 45 | 45 | 45 | 45 | 45 | 45 |
| 6 | 0 | 0 | 0 | 0 | 0 | 0 |
| 7 | -45 | -45 | -45 | -45 | -45 | -45 |
| 8 | 0 | 0 | 0 | 0 | 0 | 0 |
| 9 | 45 | 45 | 45 | 45 | 45 | 45 |
| 10 | 90 | 90 | 90 | 90 | 90 | 90 |
| 11 | -45 | -45 | -45 | -45 | -45 | -45 |
| 12 | ---- | 90 | ---- | 90 | 90 | 90 |
| 13 | ---- | ---- | 45 | 45 | 45 | 45 |
| 14 | ---- | 90 | ---- | ---- | ---- | ---- |
| 15 | ---- | ---- | 0 | 0 | 0 | 0 |
| 16 | ---- | ---- | -45 | -45 | -45 | -45 |
| 17 | ---- | ---- | ---- | ---- | 0 | 0 |
| 18 | 45 | 45 | 45 | 45 | 45 | 45 |
| 19 | 0 | 0 | 0 | 0 | 0 | 0 |
| 20 | ---- | ---- | ---- | -45 | -45 | -45 |
| 21 | 0 | 0 | 0 | 0 | 0 | 0 |
| 22 | ---- | ---- | ---- | 45 | 45 | 45 |
| 23 | ---- | ---- | ---- | ---- | 0 | 0 |
| 24 | -45 | -45 | -45 | -45 | -45 | -45 |
| 25 | ---- | ---- | ---- | ---- | 45 | 45 |
| 26 | ---- | ---- | ---- | ---- | -45 | -45 |
| 27 | 0 | 0 | 0 | 0 | 0 | 0 |
| 28 | 0 | 0 | 0 | 0 | 0 | 0 |
| 29 | ---- | ---- | ---- | ---- | -45 | -45 |
| 30 | ---- | ---- | ---- | ---- | 45 | 45 |
| 31 | -45 | -45 | -45 | -45 | -45 | -45 |
| 32 | ---- | ---- | ---- | ---- | 0 | 0 |
| 33 | ---- | ---- | ---- | 45 | 45 | 45 |
| 34 | 0 | 0 | 0 | 0 | 0 | 0 |
| 35 | ---- | ---- | ---- | -45 | -45 | -45 |
| 36 | 0 | 0 | 0 | 0 | 0 | 0 |
| 37 | 45 | 45 | 45 | 45 | 45 | 45 |
| 38 | ---- | ---- | ---- | ---- | 0 | 0 |
| 39 | ---- | ---- | -45 | -45 | -45 | -45 |
| 40 | ---- | ---- | 0 | 0 | 0 | 0 |
| 41 | ---- | 90 | ---- | ---- | ---- | ---- |
| 42 | ---- | ---- | 45 | 45 | 45 | 45 |
| 43 | ---- | 90 | ---- | 90 | 90 | 90 |
| 44 | -45 | -45 | -45 | -45 | -45 | -45 |
| 45 | 90 | 90 | 90 | 90 | 90 | 90 |
| 46 | 45 | 45 | 45 | 45 | 45 | 45 |
| 47 | 0 | 0 | 0 | 0 | 0 | 0 |
| 48 | -45 | -45 | -45 | -45 | -45 | -45 |
| 49 | 0 | 0 | 0 | 0 | 0 | 0 |
| 50 | 45 | 45 | 45 | 45 | 45 | 45 |
| 51 | 0 | 0 | 0 | 0 | 0 | 0 |
| 52 | -45 | -45 | -45 | -45 | -45 | -45 |
| 53 | 90 | 90 | 90 | 90 | 90 | 90 |
| 54 | 45 | 45 | 45 | 45 | 45 | 45 |

FIG. 5

| | BI(1) | BI(2) | BI(3) | BI(4) | BI(5) | BI(6) |
|---|---|---|---|---|---|---|
| | 1 | 3 | 5 | 6 | 8 | 10 |

| | XM1 | XM2 | XM3 | XM4 | XM5 | XM6 | XM7 | XM8 | XM9 | XM10 |
|---|---|---|---|---|---|---|---|---|---|---|
| XS1 | 1 | 0 | 0 | 0 | 0 | 0 | MB(1,7) | MB(1,8) | MB(1,9) | MB(1,10) |
| XS2 | MB(2,1) | 1 | 0 | 0 | 0 | 0 | MB(2,7) | MB(2,8) | MB(2,9) | MB(2,10) |
| XS3 | MB(3,1) | MB(3,2) | 1 | 0 | 0 | 0 | 0 | MB(3,8) | MB(3,9) | MB(3,10) |
| XS4 | MB(4,1) | MB(4,2) | MB(4,3) | 0 | 0 | 1 | 0 | 0 | MB(4,9) | MB(4,10) |
| XS5 | MB(5,1) | MB(5,2) | MB(5,3) | MB(5,4) | 0 | 0 | 0 | 1 | 0 | MB(5,10) |
| XS6 | MB(6,1) | MB(6,2) | MB(6,3) | MB(6,4) | MB(6,5) | 0 | 0 | 0 | 0 | 1 |

| COL1 | COL2 | COL3 | COL4 | COL5 | COL6 | COL7 | COL8 | COL9 | COL10 |
|---|---|---|---|---|---|---|---|---|---|
| 1 | 0 | 1 | 0 | 1 | 1 | 0 | 1 | 0 | 1 |

FIG. 7

| 0 DEGREE | 45 DEGREE | -45 DEGREE | 90 DEGREE |
|---|---|---|---|
| X(1,1)=0 | X(1,2)=1 | X(1,3)=0 | X(1,4)=0 |
| X(2,1)=0 | X(2,2)=0 | X(2,3)=0 | X(2,4)=1 |
| X(3,1)=1 | X(3,2)=0 | X(3,3)=0 | X(3,4)=0 |
| X(4,1)=0 | X(4,2)=0 | X(4,3)=1 | X(4,4)=0 |
| X(5,1)=0 | X(5,2)=0 | X(5,3)=0 | X(5,4)=1 |
| X(6,1)=0 | X(6,2)=1 | X(6,3)=0 | X(6,4)=0 |

SYMMETRIC RULE
$X(1,2) - X(6,2) = 0$

FORBIDDEN RULE
TO SHIELD 0-DEGREE FROM
THE EXPOSED SURFACE
$X(1,1) = 0, X(6,1) = 0$

GROUPING RULE FOR 0-DEGREE PLIES
$X(1,1) + X(2,1) + X(3,1) \leq 2$

SEPERATION RULE FOR 0-DEGREE
GROUPING WITH 90-DEGREE
$X(4,1) + X(5,1) + X(6,4) \leq 2$

FIG. 8

| SEQ | MASTER | Z10 | Z11 | Z12 | Z13 | Z14 | VOID EDGE | SOLID EDGE | VSD (J) | ILLUSTRATION OF SEQUENCE |
|---|---|---|---|---|---|---|---|---|---|---|
| 1 | 45° | 45° | 45° | 45° | 45° | 45° | 0 | 6 | -6 | |
| 2 | 90° | ---- | 90° | ---- | 90° | ---- | 4 | 2 | 2 | |
| 3 | 90° | 90° | 90° | 90° | ---- | 90° | 2 | 4 | -2 | |
| 4 | 45° | ---- | ---- | 45° | ---- | 45° | 2 | 4 | -2 | |
| 5 | 0° | 0° | 0° | 0° | 0° | 0° | 0 | 6 | -6 | |
| 6 | -45° | -45° | -45° | -45° | ---- | -45° | 1 | 5 | -4 | |
| 7 | 45° | ---- | 45° | ---- | ---- | 45° | 3 | 3 | 0 | |
| 8 | 90° | 90° | 90° | ---- | ---- | 90° | 3 | 3 | 0 | |
| 9 | -45° | ---- | -45° | ---- | ---- | -45° | 3 | 3 | 0 | |
| 10 | 45° | 45° | 45° | 45° | ---- | ---- | 3 | 3 | 0 | |

*FIG. 10*

COMPOSITE STACKING SEQUENCE OPTIMIZATION FOR MULTI-ZONED COMPOSITES

BACKGROUND OF THE INVENTION

1. Field of the Invention

The present invention is related to the design process of composite laminates, and more particularly, to a method for optimizing a stacking sequence for composite laminates with multiple zones having different numbers of plies.

2. Description of Related Art

Composite laminates are structures created by laminating two or more plies together such that the cumulative properties of the composite laminate are superior to the individual properties of the plies. Composite laminates are commonly used throughout industry, particularly the aerospace industry, because of their engineering qualities, design flexibility, and low weight. The vertical, or "through the thickness," arrangement, also called the stacking sequence, of the individual plies in the laminate is an important consideration in the design and manufacture of composite structures. Plies having a variety of properties, such as material and fiber orientation, must be oriented and sequenced in an optimal arrangement to provide the optimal structural performance. Furthermore, composite laminates may include multiple zones across the length and width of the part, or horizontal direction, wherein the zones have requirements for different numbers of plies of each of the materials and fiber orientations used within the part.

Sequencing of plies of a composite laminate in the horizontal and vertical directions is well known in the art. U.S. Pat. No. 5,984,511 to Vasey-Glandon et al. ("the '511 patent") discloses a knowledge driven composite design optimization process to sequence plies of a composite laminate. The '511 patent discloses techniques to optimize ply stacking horizontally across a composite laminate. However, the '511 patent does not discuss how to optimize a vertical stack of the plies based on structural rules such that the plies will be arranged for structural and cost considerations. In addition, the '511 patent discloses heuristic-based methods of sequencing the plies of a composite laminate, which implement a predetermined suite of solution procedures specifically designed for a particular kind of composite part and which lack the flexibility of prioritizing different design rules in the solution procedure.

Composite laminates having multiple zones will include internal ply edges within the composite laminate. Internal ply edges, which are also known as terminating edges, are the terminating or initiating edges of a ply, which usually occur along the boundary of a zone. The arrangement of internal ply edges is dependent on both horizontal and vertical combinations of the zone requirements into plies within the laminate. Poor placement of internal ply edges can increase the manufacturing costs for composite laminates having multiple zones. Accordingly, it is desirable to have a sequencing process that properly minimizes the internal ply edges between plies of a composite laminate. Therefore, a need exists for a process to optimize the stacking sequence of a composite laminate having multiple zones to reduce the internal ply edges.

BRIEF SUMMARY OF THE INVENTION

Methods, apparatus, and computer program products are provided according to the present invention for reducing internal ply edges in a composite laminate having two or more zones, wherein the zones have various numbers of plies having different properties. After the number of plies having each property required for each zone is determined, a master zone is generated to notionally include, for plies having each different property, the maximum number of plies having a respective property required in any one zone. The plies of the master zone are sequenced using a predefined series of design rules, and the plies of each zone are arranged based upon the stacking sequence of plies in the master zone. By arranging the plies of each zone based upon the stacking sequence of the master zone, the method, apparatus, and computer program product of the present invention reduce the internal ply edges of the composite laminate.

According to one aspect of the present invention, a method, apparatus, and computer program product are also provided to determine the number of plies of each different fiber orientation to be notionally included in the master zone. Alternatively, plies of different material may be notionally included in the master zone. Furthermore, the stacking sequence of each zone may be arranged to prevent crossovers of plies of neighboring zones or to calculate values for a second predefined series of design rules for each zone.

Further, the method, apparatus, and computer program product may provide a transformation matrix to correlate the plies of the master zone to the plies of each zone, wherein the transformation matrix is governed by the predefined series of design rules. Additionally, a weighted solid/void differential may be calculated for each zone to reduce the length or number of internal ply edges in the composite laminate by minimizing the weighted solid/void differential for each zone. Accordingly, by incorporating the transformation matrix and weighted solid/void differential when arranging the plies of each zone based upon the stacking sequence of the master zone, the method, apparatus, and computer program product of the present invention reduce the internal ply edges of the composite laminate with the most design rule compliant stacking sequence.

BRIEF DESCRIPTION OF THE SEVERAL VIEWS OF THE DRAWINGS

Figure 1:
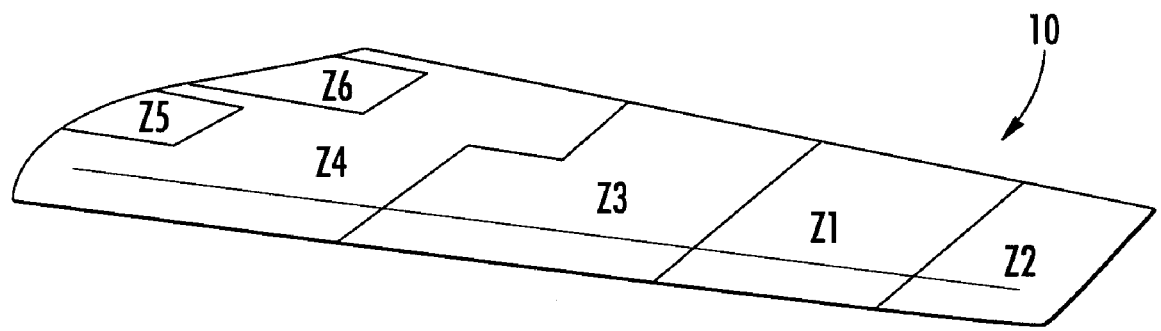
Figure 2:
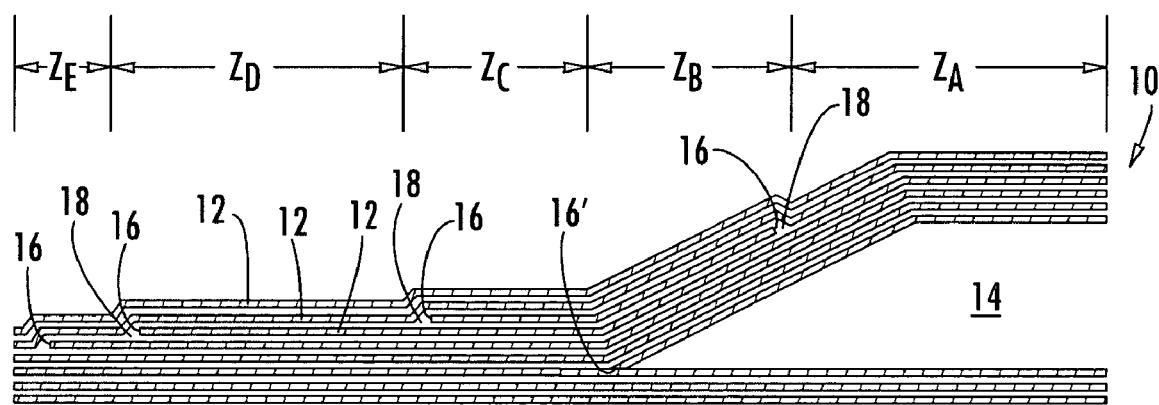
Figure 9:
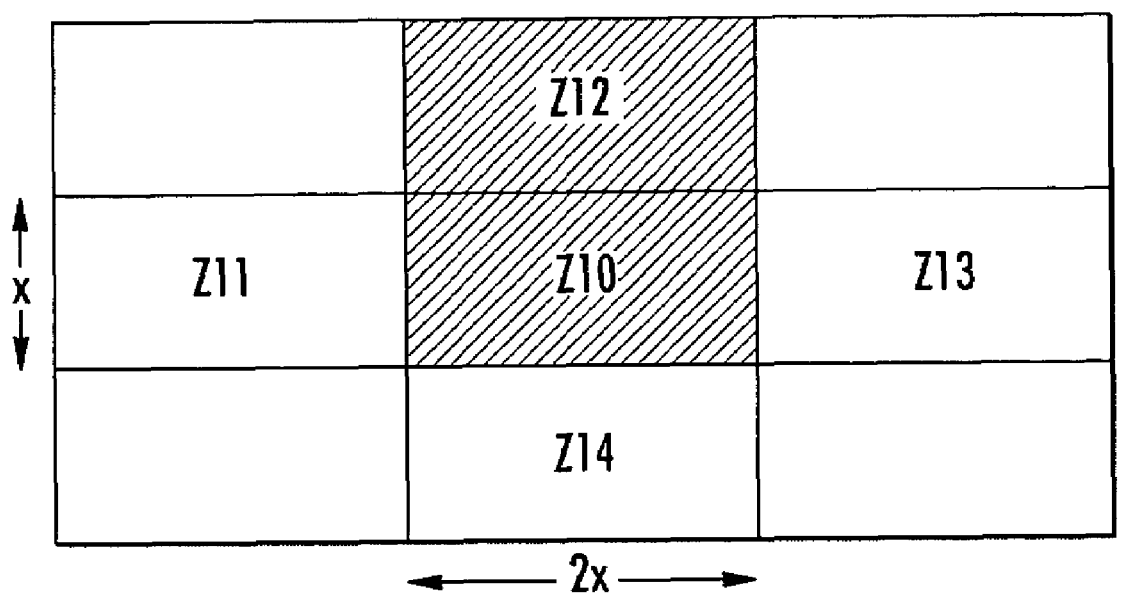
Figure 11:
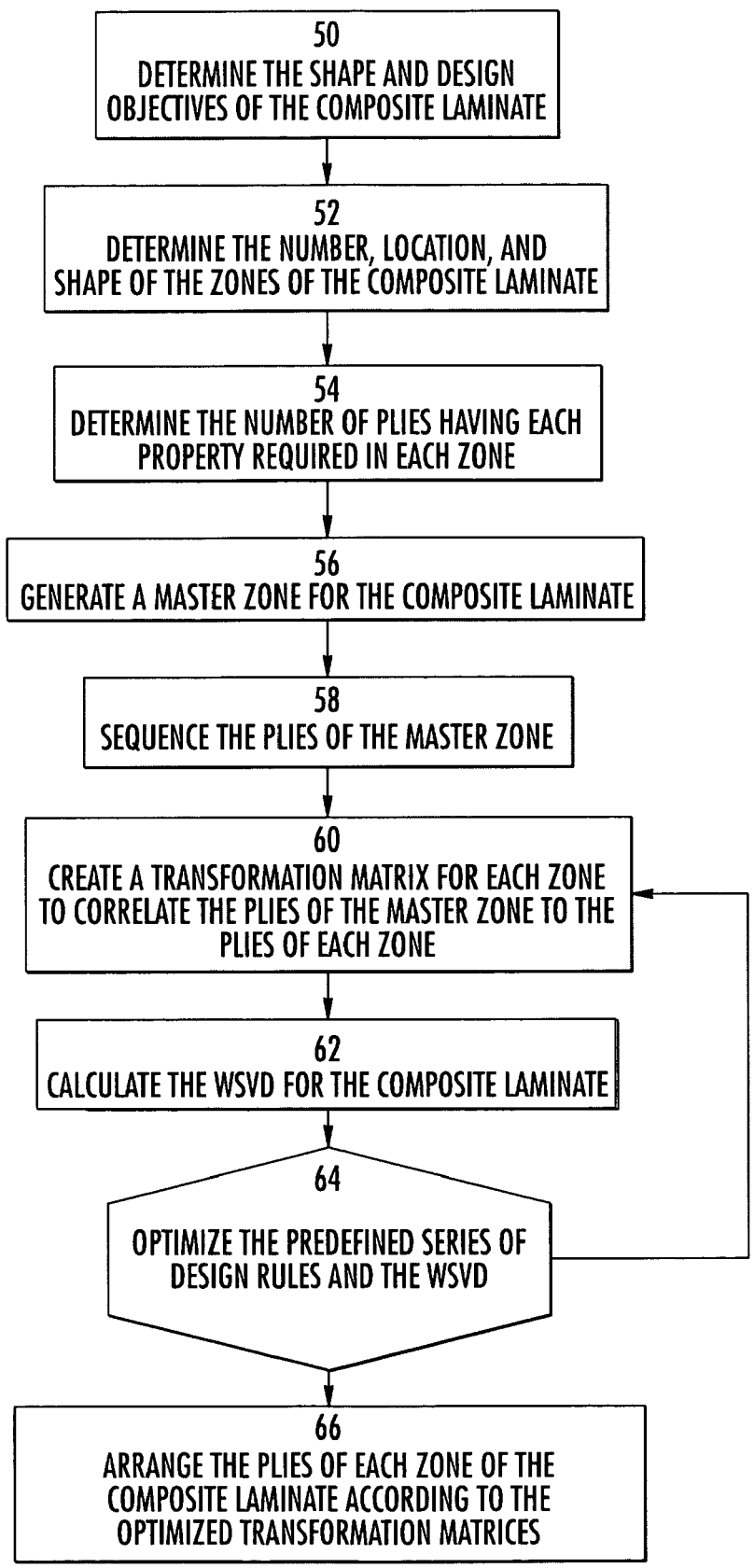

Having thus described the invention in general terms, reference will now be made to the accompanying drawings, which are not necessarily drawn to scale, and wherein:

FIG. 1 is a diagrammatic view of a composite laminate wing structure having multiple zones;

FIG. 2 is a cross-sectional, illustrative view of a composite laminate having multiple zones of different stacking sequences;

FIG. 3 is a chart illustrating the number of plies of each fiber orientation required for each zone;

FIG. 4 is a chart illustrating a stacking sequence for the master zone of a composite laminate generated from the number of plies in FIG. 3;

FIG. 5 is a chart illustrating the stacking sequence for each of the zones of a composite laminate based upon the stacking sequence of the master zone of FIG. 4;

FIGS. 6a–6f are diagrammatic views of a composite laminate showing the continuity of a ply along the zones of the composite laminate;

FIG. 7 is a chart illustrating a transformation matrix from a master zone XM to a slave zone XS used to arrange the plies of the slave zone based upon the stacking sequence of plies in the master zone;

FIG. 8 is a chart illustrating the fiber orientation of the plies of a single zone, defining variables that are used with the predefined series of design rules such as the illustrated design rules;

FIG. 9 is a top view of a composite laminate illustrating the internal ply edges;

FIG. 10 is table with perspective views of sequences of a composite laminate illustrating the solid and void edges and calculations of the VSD(J) for each sequence of a zone; and FIG. 11 is a flow chart illustrating steps to optimize the stacking sequence of the plies of a composite laminate according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–10, a method, apparatus, and computer program product in accordance with one embodiment of the present invention are provided. The method, apparatus, and computer program product of the present invention, also known as the Composite Stacking Sequence Optimizer ("CSSO"), reduce the internal ply edges in a composite laminate having two or more zones relative to comparable composite laminates that are stacked in accordance with conventional techniques. Zones are defined along the length and width of the composite laminate, which are perpendicular to the vertical stacking of the plies. The boundaries between neighboring plies are typically defined when a ply of the composite laminate terminates or initiates to define a vertical stacking sequence that is different than the stacking sequences of the neighboring zones. Therefore, each zone defines a stacking sequence that is different than the stacking sequences of the neighboring zones contiguous to that particular zone. It should be appreciated, however, that two or more non-neighboring zones of a composite laminate may define identical stacking sequences.

Various embodiments of the CSSO included in the present invention reduce the internal ply edges by either reducing the number of internal ply edges and/or the cumulative lengths of the internal ply edges of the composite laminate. The CSSO may also include a predefined series of design rules to optimize the structural and cost considerations of the composite laminate without incorporating heuristic-based methods. FIG. 1 illustrates a composite laminate 10 having multiple zones, labeled Z1 to Z6, wherein neighboring zones have different numbers of plies. The composite laminate 10 of FIG. 1 is a wing structure for use in an aerospace application. However, the method, apparatus, and computer program product of the present invention may be utilized for any composite structure in any industry, such as structural members for the auto industry or printed circuit boards for the computer industry, or may even be used for alternative applications such as asset allocation in any industry, to list a few non-limiting example.

Before the CSSO is utilized, the design objectives of the composite laminate 10 must be ascertained based upon the intended application of the particular composite laminate. Such design objectives may include dimensional constraints, weight limitations, thermal conditions, and load distributions to list a few non-limiting design objectives. The shape of the composite laminate, as well as the number, location, and shape of the zones of the composite laminate are determined based upon the ascertained design objectives. Such determinations may be reached through manual calculations, as known in the art, or through automated processes such as computer programs that are also known in the art. In addition, the number of plies having different properties required in each zone of the composite laminate 10 is also determined, by any manual or automated method, based upon the ascertained design objectives and the determined number, location, and shape of the zones of the composite laminate. Any process for determining the number, location, and shape of the zones, as well as the number of plies having different properties in each zone, for the composite laminate may be used prior to incorporating the results into the CSSO of the present invention.

FIG. 2 illustrates a cross-section of a composite laminate 10 having multiple zones $Z_A$ to $Z_E$ wherein the zones have different numbers of plies 12. FIG. 2 is not intended to illustrate any particular composite laminate, but is provided to illustrate the boundaries of individual zones and hence internal ply edges. The composite laminate 10 of FIG. 2 also comprises a core 14 that may be included between plies 12 of the composite laminate. The core 14 may be any structural component desired to be included in the composite laminate 10. The core 14 of FIG. 2 advantageously is a composite sandwich panel or a honeycomb panel, to list two non-limiting examples. Composite laminates of further embodiments using the CSSO of the present invention may include alternative cores or no core. The plies 12 of the composite laminate 10 may initiate and terminate at internal ply edges 16 that define the boundaries between the zones $Z_A$ to $Z_E$. The internal ply edges 16 are not required to initiate or terminate at perpendicular edges, which creates a generally triangular void 18 adjacent the internal ply edge. Alternatively, the internal ply edges may initiate or terminate at tapered ends, such as the internal ply edge 16' such that no void or a minimal void is created. Regardless of the location or orientation of the internal ply edges, in order to improve the structural strength of the composite laminate and to reduce the cost of manufacturing the composite laminate, the method, apparatus, and computer program product of the present invention advantageously reduce the number of internal ply edges 16 and 16' and/or the lengths of the internal ply edges in a composite laminate 10.

Composite structures advantageously include plies having different properties, and the determination of the number of plies in each zone preferably includes determining the number of plies having each property for each zone, as is known in the art. As described above, the present invention includes any process for determining the number of plies in each zone. Likewise, the present invention includes any process for determining the number of plies having each property for each zone, including manual or automated determinations. FIG. 3 is a chart for a composite laminate having zones Z1 through Z6 indicating the number of plies of each fiber orientation required in each zone. The property of the plies considered by the embodiment of the present invention that is described is the fiber orientation of the plies. Further embodiments of the CSSO may relate to alternative composite ply properties such as material, to list a non-limiting example. Use of the CSSO in non-composite applications, such as automotive structural members or asset allocations may include different properties that are unique to the particular applications. The fiber orientation of a ply represents the direction of the fibers within the ply relative to the primary direction of the load that is introduced into the composite laminate during normal operating conditions. The fiber orientations of 0, 45, −45, and 90 degrees are four angles relative to the primary load direction that are advantageously used in the composite laminate of the illustrated embodiment. Further embodiments may include two or more fiber orientations of any relative angle. Angles of 0, 45, −45, and 90 degrees are described because they are commonly used in aerospace applications, as discussed in the '511 patent which is assigned to the present assignee. The disclosure of the '511 patent is incorporated herein.

The chart of FIG. 3 is created after the number of plies of each fiber orientation has been determined based upon the design objectives of the composite laminate, as described above. As illustrated in FIG. 3, zone Z1 requires a total of 32 plies, with 12 of the 0-degree plies, 8 of the 45-degree plies, 8 of the −45-degree plies, and 4 of the 90-degree plies. The numbers of plies of each fiber orientation required for zones Z2 through Z6 are also listed in FIG. 3. This chart indicates the maximum number of plies having a respective property required in any one zone, such that the maximum number of plies having each respective property may subsequently be included in a master zone. To reduce the internal ply edges in a composite laminate, such as the cumulative length of the internal ply edges or the number of internal ply edges, the present invention introduces the concept of a master zone. The master zone is not an actual zone of the composite laminate; rather, it is a theoretical zone that notionally includes the maximum number of plies having a respective property required in any one zone. In other words, the master zone does not physically include the plies of each zone, but the master zone is generated to provide a reference zone from which zones Z1 to Z6 may be sequenced, as more fully discussed below. The master zone is essentially a template from which the stacking sequences of all the zones, called slave zones, of the actual composite laminate will be derived.

To generate the master zone of FIG. 4 from the plies charted in FIG. 3, each respective property must be individually examined to determine the maximum number of plies having the respective property in any one zone. For plies having the property of 0-degree fiber orientation, zones Z5 and Z6 each include 18 plies, the maximum number of plies with 0-degree fiber orientation. Accordingly, 18 plies of 0-degree fiber orientation are notionally included in a master zone. The same process may be repeated for each respective property. Referring again to FIG. 3, zones Z5 and Z6 include 14 plies having the property of 45-degree fiber orientation, which is the maximum number of plies having that respective property required in any one zone. Likewise, zones Z5 and Z6 also have 14 plies of −45-degree fiber orientation. Finally, zone Z2 includes 8 plies of 90-degree fiber orientation, which is the maximum number of plies having that respective property. Therefore, the master zone will comprise 18 plies of 0-degree fiber orientation, 14 plies of 45-degree fiber orientation, 14 plies of −45-degree fiber orientation, and 8 plies of 90-degree fiber orientation. Further embodiments of the present invention may include a master zone with any number of plies of each respective property and the number of plies may come from any combination of zones or may even come from a single zone. Still further embodiments of the present invention may include composite laminates having alternative properties, such that the master zone is generated based on the alternative properties.

FIG. 4 illustrates the master zone that notionally comprises the number of plies of each different property from the chart of FIG. 3. The chart of FIG. 4 illustrates the stacking sequence of the master zone after the master zone has been sequenced using a predefined series of design rules to define a stacking sequence of plies in the master zone. The predefined series of design rules are formulas or objectives used to vertically arrange the plies of a single zone to optimize the performance of that zone. A predefined series of design rules comprising at least two design rules is used with the master zone, as well as the slave zones, in some embodiments of the present invention. See the discussion of FIG. 8 below for a more detailed explanation of how the predefined series of design rules are mathematically used with a zone, whether the zone is a master zone or a slave zone. Some embodiments of the present invention may use a first predefined series of design rules with the master zone and a second predefined series of design rules with the resulting slave zones. It should be noted that mathematical modeling of these design rules, such as the design rules represented on FIG. 8 and discussed below, is applicable only when the total number of plies for the zone is given and equal to the number of sequence slots of the zone to represent a "fixed-positioning" setup, similar to the fixed-positioning of the zone of FIG. 8, as opposed to the "variable-positioning" setup of the zones of FIG. 5. If the number of available sequence slots is more than the number of plies to be arranged, as in the variable positioning of FIG. 5, the mathematical modeling of the predefined series of design rules would be rendered inapplicable.

The '511 patent referenced above discusses some of the design rules of the predefined series of design rules, in particular the design rules relating to symmetry and balance. Additional design rules include minimizing ply groupings of the same fiber orientation, separating 0-degree and 90-degree plies with off angle plies such as the 45 and −45-degree plies, alternating the off angle plies, eliminating 90-degree plies at the midplane, and burying the 0-degree plies at least three plies from the outer surface of the composite laminate, to list non-limiting examples of additional design rules. Furthermore, composite laminates sequenced by properties other than fiber orientation may have additional and alternative design rules; likewise, application of the present invention in other industries may also include alternative design rules. After the master zone has been sequenced using the predefined series of design rules, the plies of each zone of the composite laminate may be arranged based upon the stacking sequence of plies in the master zone.

FIG. 5 illustrates an example of stacking sequences for each of the zones Z1 through Z6 that were arranged based upon the master zone of FIG. 4. The dashed lines (----) represent the lack of a ply in a sequence, such as zone Z1 having no plies in sequences 12 to 17 so that the plies of sequence 11 and sequence 18 are immediately next to each other in zone Z1. The columns of FIG. 5 illustrate the stacking sequence of each zone, while each row of FIG. 5 illustrates the presence or absence in each slave zone of the ply from the corresponding sequence of the master zone. The chart of FIG. 5 illustrates variable positioning of the plies in the slave zones, as opposed to the fixed positioning of the chart for a single slave zone in FIG. 8. The fixed positioning of the slave zone plies is used in conjunction with a predefined series of design rules because the lack of a ply in a sequence illustrated in the variable positioning of FIG. 5 complicates the application of the predefined series of design rules. The variable positioning of the plies in FIG.

5 is provided merely to illustrate the correlations of the master zone plies to the slave zone plies.

FIG. 5 illustrates a stacking sequence having a reduced number or length of internal ply edges by utilizing the CSSO, as will be further described below. It should be noted that the sequences of the master zone of FIG. 4 and the resulting individual zones of FIG. 5 are mirrored along the midplane of the composite laminate, which is between the sequences 27 and 28. This mirroring of the plies provides symmetry to the composite laminate, which is advantageously one of the design rules of the predefined series of design rules. Further embodiments of the CSSO of the present invention may produce master zones that are not perfectly symmetrical or that include further design rules that take priority over the symmetry design rules.

Figure 6A:
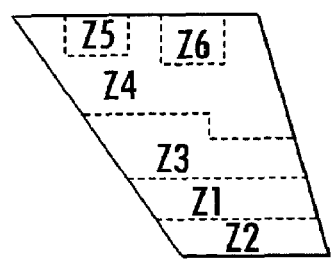
Figure 6B:
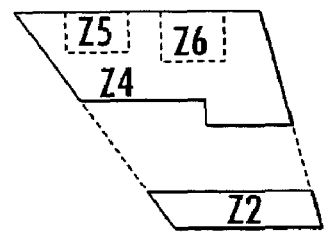
Figure 6C:
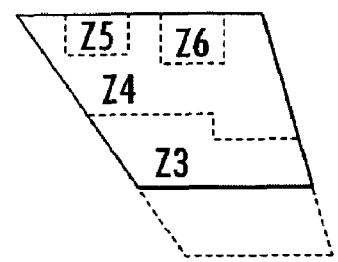
Figure 6D:
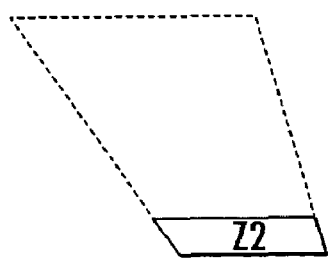
Figure 6E:
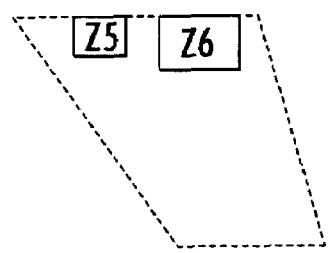
Figure 6F:
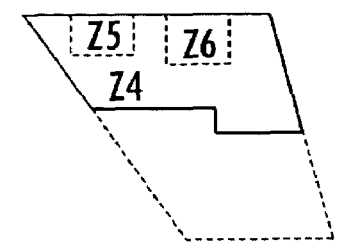

FIGS. 6a–6f illustrate how different plies of the composite laminate of FIG. 5 use the zone boundaries of the composite laminate. The presence of the zone label Z1 to Z6 in each of FIGS. 6a–6f indicates the incorporation of the zone in the particular sequence that the figure is illustrating. For example, FIG. 6a illustrates a ply from any sequence from 1 through 11 (using all six zones); FIG. 6b illustrates two plies from sequence 12 (the first ply using zones Z4, Z5, and Z6; and the second ply using zone Z2); FIG. 6c illustrates a ply from sequence 13 (using zones Z3, Z4, Z5, and Z6); FIG. 6d illustrates a ply from sequence 14 (using zone Z2); FIG. 6e illustrates two plies from sequence 17 (the first ply using zone Z5; and the second ply using zone Z6); and FIG. 6f illustrates a ply from sequence 20 (using zones Z4, Z5, and Z6). The views of FIGS. 6a–6f are not cross-sectional views of the actual composite laminate, but are diagrammatic views that track a ply through the zones Z1 to Z6 regardless of the vertical position of the ply in each zone. A ply that is used in two or more neighboring zones may be at different relative vertical positions because the voids in sequences above or below the illustrated ply do not physically occur in the zones in the actual composite laminate. The voids where a ply is not used in a sequence is distinguishable from the triangular void 18 of FIG. 2 or other voids created by the internal ply edges. Accordingly, FIGS. 6a–6f show the continuity of an individual ply along the zones Z1 to Z6, wherein a ply is not continuous if the zone name is not present in the figure. This lack of continuity, which creates the terminating and initiating edges of a ply that define the internal ply edges of the composite laminate, is advantageously reduced by the CSSO of the present invention.

After the master zone has been generated and sequenced, the stacking sequence of the master zone may be used to arrange the plies of each zone of the composite laminate, which are preferably called slave zones in the embodiment of FIGS. 7 and 10. To simplify the description of the CSSO, the composite laminates of FIGS. 7 and 10, having only 10 plies in the master zone and 6 plies in the particular slave zone of interest, are used to illustrate the CSSO rather than the composite laminate of FIGS. 3, 4, and 5. However, composite laminates having any number of plies in the master zone, or in the slave zones, may use the CSSO described herein.

To arrange each of the slave zones of the composite laminate based on the master zone, a transformation matrix, such as the matrix illustrated in FIG. 7, is utilized to arrange the plies of each zone. The transformation matrix of FIG. 7 indicates a master zone of 10 plies being transformed into a slave zone of 6 plies. The transformation matrix of FIG. 7 includes variables MB(i,j) for each slave zone sequence from 1 to i and for each master zone sequence from 1 to j. The MB(ij) variables are integers of 1 or 0, wherein 1 represents the presence of the master zone ply sequence j transformed to the slave zone sequence i, and wherein 0 represents that the master zone ply j is not included in the slave zone sequence i. Each row of the transformation matrix must include one and only one MB variable with a value of 1 because the transformed slave stack is a fixed positioning setup, and allows each slave zone sequence to include one and only one ply from the master zone. Similarly, each column must include no more than one MB variable with a value of 1 because each master zone ply can correspond to no more than one sequence of the slave zone, as indicated by the column variables COL1 through COL10 provided in FIG. 7 and discussed below. Some MB variables of the transformation matrix must have a value of zero. For example, MB(2,1) is the transformation matrix variable representing the transformation from the sequence 1 of the master zone (XM1) to the second sequence of the slave zone (XS2), and it must have a value of 0. If the mapping from XM1 to XS2 where to occur, it would yield a first sequence of the slave zone (XS1) unmapped without a ply crossing which is undesirable as described below. The MB variables labeled on FIG. 7 are vanishing components that are beyond the bandwidth of the transformation matrix and have effective values of zero.

As a result, the transformation matrix of FIG. 7 is a banded matrix wherein the bandwidth of each row is equal to the total number of master zone plies minus the total number of slave zone plies plus one. For a master zone having j sequences and a slave zone having i sequences, the transformation matrix bandwidth equals j−i+1. For the transformation matrix of FIG. 7, the bandwidth is 5 because j=10 and i=6. Further embodiments may comprise a bandwidth of any number greater than or equal to 1. The bandwidth advantageously begins at the cell where i=j, as illustrated in FIG. 7; however, further embodiments may comprise bandwidths that begin at any location so long as each required sequence of the slave zone includes a ply mapped to the master zone. The bandwidth extends along a row of the matrix a number of cells that is equal to the bandwidth, such as 5 cells in the illustrated embodiment. As noted above, the MB variables labeled on FIG. 7 are vanishing components beyond the bandwidth of the transformation matrix and have effective values of zero. The mapping illustrated in FIG. 7 also does not permit ply crossings. As a result of the mapping correlations between the master zone and the slave zone, a staircase pattern is defined in the transformation matrix, as indicated by the bold line on FIG. 7. Each step of the staircase is defined where the MB variable equals to 1, and the staircase must continue downward, and only downward, as it progresses to the right. The staircase pattern represents the absence of ply crossings, which is not permitted in the CSSO. In one embodiment of the present invention, the ply crossings are prevented with calculations using the BI variable provided in FIG. 7.

The BI variable of FIG. 7 is used to mathematically prevent ply crossings in the composite laminate, wherein a set of equations incorporating the BI variable is advantageously included when using the transformation matrix. The BI variable is equal to the master zone sequence, or j value, for each ply that is mapped to the slave zone. Mathematically, the BI variable for each slave sequence can be represented as the linear combination of the MB variables multiplied by the coefficient of the master sequence number j, for all variables within the bandwidth. An example equation is $BI(1)=\Sigma(j*MB(1,j))$, j=1:6 for the sequence 1 of the slave zone.

To prevent ply crossings, the value of BI for each sequential slave zone sequence must be greater than the BI value of the previous sequence. Advantageously, the equation to prevent ply crossings is $BI(n+1)-BI(n) \geq 1$ where n is the index of the slave zone running from 1 to (i−1). Therefore, the BI(2) of the second slave zone sequence XS2 is 3 and the BI(1) of the first slave zone sequence XS1 is 1, thus the difference of 2 is greater than 1 indicating the absence of a ply crossing. Likewise, the BI(3) is 5 and the BI(2) is 3, and so forth. All the calculations produce results that are greater than or equal to 1, thus ensuring there are no ply crossings in the slave zone. Further embodiments of the transformation matrix may include an alternative way to prevent ply crossings or may include no calculations pertaining to ply crossings.

The predefined series of design rules are also applied to the individual zones that have been sequenced from the master zone. FIG. 8 illustrates the fiber orientations of plies of a slave zone sequenced from a master zone, such as a slave zone from the transformation matrix of FIG. 7. The predefined series of design rules can be mathematically applied, and FIG. 8 illustrates how the plies of the zone are mathematically represented. As mentioned above, FIG. 8 shows the fixed positioning of the slave zone, wherein a ply is in every sequence of the zone, as opposed to the variable positioning of FIGS. 5 or 10, which both include voids in the sequences of the zones. The variable X(m,n) is provided and has a value of 0 to represent the absence of a ply or a 1 to represent the presence of a ply in the sequence m of a ply having a fiber orientation of n. The slave zone comprises six sequences, thus m=1:6, and the 0-degree plies have been given a n value of 1, the 45-degree plies an n value of 2, the −45-degree plies an n value of 3, and the 90-degree plies an n value of 4. Alternative embodiment may assign alternative n values to the respective properties or to alternative sets of different properties. The chart of FIG. 8 represents a slave zone having a 45-degree ply in the first sequence, a 90-degree ply in the second sequence, a 0-degree ply in the third sequence, and so forth. This representation of the slave zone sequences advantageously provides for convenient calculations of values for the predefined series of design rules.

The predefined series of design rules may comprise one or more mathematical constraints that are representative of the design rules. One example is a symmetry rule, which for the embodiment of FIG. 8 may be represented by an equation $X(1,n)-X(6,n)=0$ to determine if the outermost plies have the same fiber orientation. FIG. 8 illustrates the comparison of X(1,2) and X(6,2) which indicate that both the first and sixth sequences have a ply of 45-degree fiber orientation, thus satisfying the mathematical representation of the design rule. Likewise, the equation $X(2,n)-X(5,n)=0$ can also be applied to determine if the second and fifth sequences have plies of the same fiber orientation. The same can be done for the third and fourth sequences. These design rules, as well as additional design rules, are modeled as mathematical constraints as in a canonical optimization framework, with assigned penalty variables for each constraint violation. All penalty variables are given weighted values based on the design rule priority assignment and are advantageously summed to determine a zone sequence that satisfies the design rules in an optimal sense. Further embodiments of the present invention include alternative equations or values for the symmetry rule or do not include the symmetry rule.

A second design rule that may be included in the predefined series of design rules of further embodiments of the present invention is to minimize groupings of plies with the same orientation, for example, a grouping rule to ensure no more than three consecutive sequences of 0-degree plies. For the zone of FIG. 8, the equation $X(m,1)+X(m+1,1)+X(m+2,1) \leq 2$ for m=1 to 4 may be used to determine that there is not three consecutive 0-degree plies of the zone through the sequences. FIG. 8 illustrates the grouped sequences for 0-degree plies, where n=1, indicating that only one ply of the 0-degree fiber orientation is in the three consecutive sequences of interest. Further embodiments of the present invention include alternative equations or values for the grouping rule or do not include the grouping rule.

A third design rule that may be included in the predefined series of design rules of further embodiments of the present invention is a separation rule, for example, to avoid consecutively sequencing 0-degree plies and a 90-degree ply (e.g., $X(4,1)=1, X(5,1)=1$, and $X(6,4)=1$) or to avoid sequentially sequencing a 0-degree ply and a 90-degree ply (e.g., $X(1,1)=1$ and $X(2,4)=1$). For the illustrated embodiment, the separation rule is provided to separate the 0-degree plies and the 90-degree plies with off-angle plies of 45 and −45-degrees. Similar equations are used for all the combinations of consecutive sequences that are desired to be separated. Further embodiments of the present invention may separate plies having different properties or may separate plies to have alternative relative relationships. Still further embodiments of the present invention include alternative equations or values for the separation rule or do not include the separation rule.

A fourth design rule that may be included in the predefined series of design rules of further embodiments of the present invention is a forbidden rule to ensure that certain plies are not included in certain sequences of the zone. These forbidden rules advantageously depend upon the composite laminate being sequenced. For the zone of FIG. 8, the equations $X(1,1)=0$ and $X(6,1)=0$ are used to ensure that a 0-degree ply is not located on an outer surface of the composite laminate to shield primary load direction plies from the exposed surface to increase damage resistance. Likewise, additional equations may be added to forbid plies of other fiber orientation from other sequences. Further embodiments of the present invention include alternative equations or values for the forbidden rule or do not include the forbidden rule.

As mentioned above, a predefined series of design rules comparing at least two or more design rules is advantageously used during the sequencing of the master zone. Likewise, a second predefined series of design rules, which may or may not be the same predefined series of design rules as used during the sequencing of the master zone, is advantageously used for each of the slave zones that are arranged based upon the stacking sequence of plies in the master zone. When different predefined series of design rules are used, the differences may include the addition or removal of design rules and/or alternative priority weights assigned to the design rules, to list two non-limiting examples. Each equation or group of equations corresponding to a single design rule may be given weighted values for an overall mathematical assessment of how closely a zone conforms to the predefined series of design rules. Preferably the plies of a zone follow all the design rules of the predefined series of design rules; however, zones often do not satisfy all the design rules. Accordingly the design rules are prioritized by giving them weighted values, wherein the values are based on whether the design rules are satisfied or not. If the arranging of the plies of each zone based upon the stacking sequence of plies in the master zone is performed over many iterations, the mathematical values indicating a zone's satisfaction of the design rule may be compared during each iteration to advantageously optimize the stacking sequence of that zone based on the weighted predefined series of design rules. Further embodiments of the present invention may include alternative design rules, alternative equations, alternative ways to prioritize or weight design rules, or may not include the use of a predefined series of design rules.

The CSSO of one embodiment of the present invention advantageously incorporates a weighted solid/void differential ("WSVD") variable when arranging the plies of each zone based upon the master zone. The WSVD is a quantitative measure used by CSSO to minimize the internal edges of a composite laminate when arranging plies of each slave zone. An internal edge incurs between neighboring zones, also called contiguous zones, when a ply is present in a sequence of a first zone but is not present in the same sequence of the second, neighboring zone. The length of the common boundary of a neighboring zone is the zone boundary edge length. A solid edge is the common zonal boundary edge for a ply of an individual sequence of a first zone when a second, neighboring zone includes a ply, also called a "solid ply neighbor," in the same sequence as the ply of the first zone. Likewise, a void edge is the common zonal boundary edge for a ply of an individual sequence of a first zone when a second, neighboring zone does not include a ply, also called a "void ply neighbor," in the same sequence as the ply of the first zone. The sequences considered during the WSVD calculations are based on the sequences of the master zone, such that a sequence of the slave zone may include a void. The voids of slave zones along the sequences of the master zone may represent terminating or initiating edges of neighboring plies of the same sequence.

The WSVD is the differential of the solid edge lengths and the void edge lengths for each neighboring zone and is calculated based on each sequence of a zone. The WSVD values from each sequence of a zone are added to define a single WSVD value for that zone. The solid and void edge length values are actual dimensions normalized to the nearest dimensional unit used to measure the lengths, such as a centimeter or a millimeter, to list two non-limiting examples. The single WSVD value for each zone is advantageously minimized during the CSSO solution procedure when the plies of each zone are arranged based upon the stacking sequence of plies in the master zone. Minimizing the WSVD value of a zone effectively minimizes the internal edge lengths, and possibly the number of internal edge, of the plies of that zone. Further embodiments of the CSSO may include alternative means of minimizing the number or length of internal ply edges when arranging the plies of each slave zone.

FIGS. 9 and 10 illustrate solid edge lengths and void edge lengths of sequences of a composite laminate. FIG. 9 illustrates a composite laminate with at least five zones that are labeled Z10, Z11, Z12, Z13, and Z14. Zones Z10 and Z12 are shaded to indicate the presence of a ply in only zones Z10 and Z12 for the particular sequence shown in FIG. 9. The ply of zone Z10 is the ply of interest in this example; accordingly, the solid edge lengths and void edge lengths of zone Z10 will be calculated to determine a difference between the solid and void edge lengths, referred to as the VSD(J), which will be subsequently used in the calculation of the WSVD. The value for VSD(J) is determined by subtracting the total solid edge lengths from the void edge lengths. FIG. 9 illustrates zone Z10 being generally rectangular with edge lengths of x and 2x. Because the same sequence of the neighboring zones Z11, Z12, Z13, and Z14 have a ply in only Z12, zone Z10 has a solid edge length of 2x and a void edge length of 4x. The solid edge length of 2x is derived from the shared edge between zones Z10 and Z12, and the void edge length of 4x is derived from the terminating edges between zone Z10 and zones Z11, Z13, and Z14. The VSD(J) of the sequence of zone Z10 of FIG. 9 is 2x.

FIG. 10 includes calculations of the VSD(J) of each sequence of zone Z10, such as the zone illustrated in FIG. 8. The edge lengths are normalized lengths of 1 and 2, similar to the embodiment of FIG. 9, and the VSD(J) column indicates the calculated VSD(J) for each sequence. The right-most column of FIG. 10 illustrates the locations of each ply in each zone, wherein the zones are relatively oriented similar to FIG. 9. FIG. 10 includes hatch patterns on the plies to show each fiber orientation for illustrative purposes only.

The WSVD for a zone is calculated by summing the products of VSD(J) of each sequence multiplied by a column-mapping variable COL(J) for that sequence, which is represented by the equation WSVD=Sum(VSD(J)*COL(J)). FIG. 7 provides values for COL(J) for the illustrated embodiment, wherein the value of COL(J) is a 0 if no ply is located in the sequence J or a 1 if a ply is present in the sequence J. Therefore, the sequences having no plies are effectively not contributing to the summed values of the WSVD, thus the calculating of the WSVD comprises summing all the differences of edge lengths of the plies of the zone, which does not necessarily include all the sequences of the zone because the sequences are based upon the master zone. For the zone Z10 illustrated in FIG. 10, the WSVD is −20 because sequences 2, 4, 7, and 9 have COL(J) values of 0. Further embodiments of the WSVD may calculate the internal edges or internal edge lengths by alternative methods in order to reduce the number or length of internal edges.

By using the lengths of solid and void edges, rather than a discrete value for the presence of solid and void edges, when calculating the WSVD, the CSSO reduces the cumulative lengths of internal ply edges of the composite laminate rather than the total number of internal ply edges. However, reducing the cumulative lengths of the internal ply edges presumably reduces the number of internal ply edges in the composite laminate. Alternative embodiments of the present invention may include a WSVD that gives a discrete value to the solid edges and void edges independent of the lengths of the edges, such that the WSVD reduces the number of internal ply edges in a composite laminate.

The WSVD values for each zone are advantageously calculated concurrently, and may be summed for a WSVD value for the entire composite laminate. The WSVD value for the individual zones or even the entire composite laminate is calculated for a set of transformation matrices for the slave zones, which may be concurrent with the calculations of the predefined series of design rules for that set of transformation matrices. Transformation matrices are incrementally changed in iterative loops of the CSSO with an optimization procedure known in the art, such that the values of the WSVD and/or the predefined series of design rules calculations are minimized. Additionally the predefined series of design rules are also mathematically calculated for each iteration of the transformation matrices, and the predefined series of design rules are advantageously optimized with the WSVD during the optimization procedure. Accordingly, the minimized WSVD results in a composite with reduced internal edge lengths, and presumably a reduced number of internal ply edges. In addition, the optimized predefined series of design rules results in a composite laminate with an optimal amount of fulfilled design rules. During the optimization procedure, the WSVD and the predefined series of design rules advantageously include relative weights to assist in the optimization. Further embodiments of the present invention may use alternative means to reduce the length and/or number of internal ply edges or the number of unsatisfied design rules in the predefined series of design rules when arranging the plies of each zone based upon the stacking sequence of the master zone.

Because the values of the WSVD and/or the predefined series of design rules are calculated concurrently with the utilization of the transformation matrix, the method, apparatus, or computer program product using the CSSO may perform multiple iterations before reaching the optimum stacking sequence for the composite laminate. These iterations may be desirable because the values of the WSVD and/or the predefined series of design rules are based upon the transformation matrix of each zone of the composite laminate, and an iteration to reduce the value of the WSVD and/or design rules changes one or more transformation matrices which accordingly changes the value of the WSVD and/or design rules. This process of changing the transformation matrices, calculating the WSVD and the predefined series of design rules, changing one or more transformation matrices, and comparing the set of new values of the WSVD and the weighted design rule violations to one or more previous sets of values may be repeated until a set of values is minimized such that the internal ply edges are reduced and an optimal number of design rules are satisfied when compared to stacking sequence approaches previously know in the art, such as heuristic sequencing of composite laminates. Advantageously, an optimization technique known in the art, such as the branch-and-bound optimization technique to list one non-limiting example, is also advantageously utilized for the iterations of the CSSO. These iterations, as well as the other calculations of the CSSO, are preferably performed by an apparatus with processing circuitry, such as a processor or other computing device.

The various methods of the present invention are generally implemented by a computer program product that may direct the operation of a processing circuitry. This computer program product includes a computer-readable storage medium, such as the non-volatile storage medium, and computer-readable program code portions, such as a series of computer instructions, embodied in the computer-readable storage medium. Further implementations of the present invention may performed by alternative devices.

In this regard, FIG. 11 is a flowchart of the steps for sequencing the plies of a composite laminate, wherein steps 56 to 66 are functions implemented by the computer program products of the invention, and more preferably steps 50 to 66 are functions implemented by the computer program products of the invention. Advantageously, steps 50, 52, and 54, that are not included in the CSSO process, are performed by the same computer program product that performs steps 56 to 66 of the CSSO process discussed herein; however, further embodiments of the present invention may include fewer steps, additional steps, or alternative steps.

It will be understood that each step 50 to 66 of the flowchart can be implemented by or with computer program instructions. These computer program instructions may be loaded onto processing circuitry, such as on a computer or other programmable apparatus to produce a machine, such that the instructions which execute on the computer or other programmable apparatus create means for implementing the functions specified in the flowchart blocks or steps. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart blocks or steps. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart blocks or steps.

Accordingly, blocks or steps of the flowchart support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of reducing internal ply edges in a composite laminate having two or more zones, wherein the zones have various numbers of plies having different properties, the method comprising the steps of:

determining the number of plies having each property required in each zone;

generating a master zone that notionally includes, for plies having each different property, the maximum number of plies having a respective property required in any one zone;

sequencing the plies of the master zone using a predefined series of design rules to define a stacking sequence of plies in the master zone;

arranging the plies of each zone based upon the stacking sequence of plies in the master zone; and providing instructions configured to at least partially direct manufacture of the composite laminate based upon an arrangement of the plies of each zone.

2. A method according to claim 1 wherein determining the number of plies comprises determining the number of plies of each different fiber orientation.

3. A method according to claim 1 wherein determining the number of plies comprises determining the number of plies of each different material.

4. A method according to claim 1 wherein arranging the plies of each zone comprises preventing cross-overs of plies of neighboring zones.

5. A method according to claim 1 wherein arranging the plies of each zone comprises calculating values for a second predefined series of design rules for each zone.

6. A method according to claim 1 wherein arranging the plies of each zone comprises utilizing a transformation matrix for each zone to correlate the plies of the master zone to the plies of each zone.

7. A method according to claim 6 wherein arranging the plies of each zone comprises the steps of:
calculating a weighted solid/void differential for each zone; and
minimizing the weighted solid/void differential for each zone.

8. A method according to claim 7 wherein calculating the weighted solid/void differential comprises the steps of:
subtracting a solid edge length of a single ply of the zone from a void edge length of the single ply of the zone to determine a difference; and
summing all the differences of the plies of the zone.

9. A method according to claim 8 wherein calculating the weighted solid/void differential comprises normalizing the solid edge lengths and the void edge lengths before subtracting the solid edge length from the void edge length.

10. A method according to claim 1, further comprising the step of determining the number of zones for the composite laminate prior to the determining the number of plies step.

11. A method of reducing internal ply edges in a composite laminate aerospace application having two or more zones, wherein the zones have various numbers of plies of different fiber orientations, the method comprising the steps of:
determining the number of zones for the composite laminate aerospace application;
determining the number of plies of each fiber orientation required in each zone;
generating a master zone that notionally includes, for plies having each different fiber orientation, the maximum number of plies having a respective fiber orientation required in any one zone;
sequencing the plies of the master zone using a predefined series of design rules to define a stacking sequence of plies in the master zone;
arranging the plies of each zone based upon the stacking sequence of plies in the master zone; and
providing instructions configured to at least partially direct manufacture of the composite laminate based upon an arrangement of the plies of each zone.

12. A method according to claim 11 wherein arranging the plies of each zone comprises calculating values for a second predefined series of design rules for each zone.

13. A method according to claim 11 wherein arranging the plies of each zone comprises utilizing a transformation matrix for each zone to correlate the plies of the master zone to the plies of each zone.

14. A method according to claim 13 wherein arranging the plies of each zone comprises the steps of:
calculating a weighted solid/void differential for each zone; and
minimizing the weighted solid/void differential for each zone.

15. A method according to claim 14 wherein calculating the weighted solid/void differential comprises the steps of:
subtracting a solid edge length of a single ply of the zone from a void edge length of the single ply of the zone to determine a difference; and
summing all the differences of the plies of the zone.

16. A method according to claim 15 wherein calculating the weighted solid/void differential comprises normalizing the solid edge lengths and the void edge lengths before subtracting the solid edge length from the void edge length.

17. An apparatus for reducing internal ply edges in a composite laminate having two or more zones, wherein the zones have various numbers of plies having different properties, the apparatus comprising:
processing circuitry for: (i) determining the number of plies having each property required in each zone; (ii) generating a master zone that notionally includes, for plies having each different property, the maximum number of plies having a respective property required in any one zone; (iii) sequencing the plies of the master zone using a predefined series of design rules to define a stacking sequence of plies in the master zone; (iv) arranging the plies of each zone based upon the stacking sequence of plies in the master zone; and (v) providing instructions configured to at least partially direct manufacture of the composite laminate based upon an arrangement of the plies of each zone.

18. An apparatus according to claim 17 wherein the processing circuitry determines the number of plies of each different fiber orientation.

19. An apparatus according to claim 17 wherein the processing circuitry calculates values for a second predefined series of design rules for each zone.

20. An apparatus according to claim 17 wherein the processing circuitry utilizes a transformation matrix for each zone to correlate the plies of the master zone to the plies of each zone, wherein the transformation matrix is governed by the predefined series of design rules.

21. An apparatus according to claim 20 wherein the processing circuitry calculates a weighted solid/void differential for each zone, and wherein the processing circuitry minimizes the weighted solid/void differential for each zone.

22. An apparatus according to claim 21 wherein the processing circuitry subtracts a solid edge length of a single ply of the zone from a void edge length of the single ply of the zone to determine a difference, and wherein the processing circuitry sums all the differences of the plies of the zone.

23. An apparatus according to claim 22 wherein the processing circuitry normalizes the solid edge lengths and the void edge lengths before subtracting the solid edge lengths from the void edge lengths.

24. An apparatus according to claim 17 wherein the processing circuitry determines the number of zones for the composite laminate prior to determining the number of plies having each property required in each zone.

25. A computer program product for reducing internal ply edges in a composite laminate having two or more zones, wherein the zones have various numbers of plies having different properties, the computer program product comprising a computer-readable storage medium having computer-readable program instructions stored therein, the computer-readable program portions comprising:
a first executable portion for determining the number of plies having each property required in each zone;
a second executable portion for generating a master zone that notionally includes, for plies having each different property, the maximum number of plies having a respective property required in any one zone;
a third executable portion for sequencing the plies of the master zone using a predefined series of design rules to define a stacking sequence of plies in the master zone;
a fourth executable portion for arranging the plies of each zone based upon the stacking sequence of plies in the master zone; and a fifth executable portion for providing instructions configured to at least partially direct manufacture of the composite laminate based upon an arrangement of the plies of each zone.

26. A computer program product according to claim 25 wherein the first executable portion is further capable of determining the number of plies of each different fiber orientation.

27. A computer program product according to claim 25 wherein the fourth executable portion is further capable of calculating values for a second predefined series of design rules for each zone.

28. A computer program product according to claim 25 wherein the fourth executable portion is further capable of utilizing a transformation matrix for each zone to correlate the plies of the master zone to the plies of each zone, wherein the transformation matrix is governed by the predefined series of design rules.

29. A computer program product according to claim 28 wherein the fourth executable portion is further capable of calculating a weighted solid/void differential for each zone and is capable of minimizing the weighted solid/void differential for each zone.

30. A computer program product according to claim 29 wherein the fourth executable portion is further capable of subtracting a solid edge length of a single ply of the zone from a void edge length of the single ply of the zone to determine a difference and is capable of summing all the differences of the plies of the zone.

31. A computer program product according to claim 30 wherein the fourth executable portion is further capable of normalizing the solid edge lengths and the void edge lengths before subtracting the solid edge length from the void edge length.

* * * * *